PHONOGRAPH APPARATUS

Filed April 9, 1953 2 Sheets-Sheet 1

INVENTOR.
WINFIELD W. LOOSE
BY
Brown, Denk & Synnestvedt
AGENTS

INVENTOR.
WINFIELD W. LOOSE
BY
Brown, Denk & Synnestvedt
AGENTS

United States Patent Office 2,855,204

Patented Oct. 7, 1958

2,855,204

PHONOGRAPH APPARATUS

Winfield W. Loose, Philadelphia, Pa., assignor to Philco Corporation, Philadelphia, Pa., a corporation of Pennsylvania Application April 9, 1953, Serial No. 347,769

6 Claims. (Cl. 274—10)

The present invention relates to phonograph apparatus and, particularly, to automatic phonograph record changers in which provision is made to support a stack or records above the turntable and to feed the supported records successively onto the turntable. More specifically, the invention herein disclosed and claimed has to do with a central spindle or center post drop-type of phonograph record changing apparatus.

Various kinds of phonograph records are currently available for home use. These are commonly known as 45-R. P. M. records, 33⅓-R. P. M. records and 78-R. P. M. records. Certain 45-R. P. M. records have a central aperture which is substantially larger than the central aperture of the other kinds of records. For that reason, phonographs in which the turntable is supplied with a central spindle designed to accommodate records having the smaller central aperture, cannot be used for playing records having the larger central aperture without providing specially made record inserts or adapter spindles.

The provision of adapter spindles which are designed for use with records having the larger central aperture and which are constructed for association with spindles devised to support and to drop records having the smaller central aperture, gives rise to constructional as well as operational problems and difficulties. These problems and difficulties stem mainly from the fact that, heretofore, adapter spindles have been constructed with duplicate parts designed to support and to release records and that the use of duplicate parts necessitates complicated mechanism to insure synchronous operation.

It is an object of this invention to provide a spindle arrangement which is constructed and operated in an improved and novel manner. The improved and novel construction and operation of the arrangement makes it possible to eliminate duplication of parts and to simplify the mechanism employed to actuate the adapter spindle for releasing supported records, thus overcoming the more serious problems and difficulties heretofore encountered in arrangements of this kind.

It is also an object of the invention to construct an adapter spindle which, when put to use, is rigidly associated with the turntable so as to insure greater stability in supporting the records for discharge onto the turntable.

Another and more specific object of the invention resides in providing an arrangement wherein the same mechanism employed to actuate the spindle which is used for records of the type having the smaller central aperture, is also employed to actuate the adapter spindle which is used for records of the type having the larger central aperture. This adds to the simplicity of the record-supporting and record-discharging means and insures adequate operation of said means.

In a broader aspect, the arrangement provided by this invention to attain the foregoing objects and advantageous features, comprises a spindle device which is adapted to be removably associated with a phonograph turntable and which has a diameter large enough to accommodate records of the type having the larger central aperture. This larger spindle in also adapted for association with a smaller spindle which is mounted on the phonograph structure and which is capable of accommodating records of the type having the smaller central aperture. Each of these two spindles includes means to effect release of records, and the association of said means is such that operation of the means included in the larger spindle occurs in response to the operation of means included in the smaller spindle. In a narrower aspect, the smaller spindle and the removable larger spindle are constructed of lower and upper parts. The upper part of each spindle is adapted for movement in a generally horizontal direction, from a first position in which elements of the two parts cooperate for supporting records, to a second position in which said elements cooperate to effect release of the lowermost supported record. The upper part of the smaller spindle is moved from its normal or first position by means of mechanism associated with said smaller spindle, and the upper part of the removable larger spindle, when engaged with said smaller spindle, is moved from its normal or first position through movement of the upper part of said smaller spindle.

In a specific embodiment of the larger or adapter spindle, records placed in engagement therewith are suspended above the turntable by means of shouldered elements which normally protrude from the circumferential surface of said adapter spindle for a distance sufficient to underlie the record surface portion adjacent the central aperture therein. The shouldered elements are retractable within the body of the adapter spindle to free the suspended records. In order to prevent dropping of the suspended records except the lowermost one, there is provided a knife or blade which is normally retracted within the adapter spindle, but which is movable to emerge from said spindle prior to retraction of the shouldered elements so as to enter between the lowermost record and the one immediately above it, thus holding the suspended records which are over the lowermost one. Also, in accordance with a characteristic feature of the invention, protection against dropping of records except the lowermost one, is further assured by means of a portion of the lower part of the adapter spindle, which portion becomes exposed and underlies the recods above the lowermost one to cooperate with said knife or blade in supporting said records.

The full nature of the invention and the manner in which the above stated and other objects and features are obtained, will be more fully understood from the following description based on the accompanying drawings in which.

Figure 1:
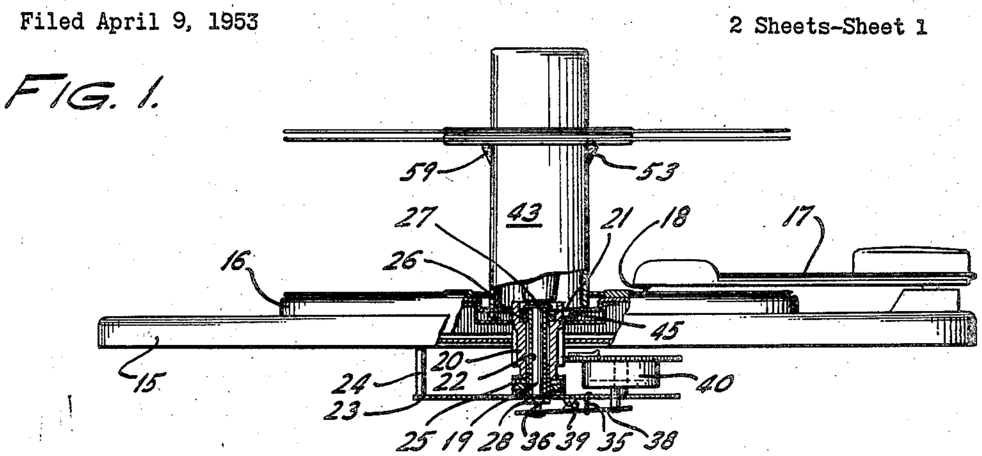
Figure 1 is a side elevational view of a record changing phonograph apparatus incorporating the invention, certain portions being broken or cut away for better illustration.

With more particular reference to the drawings, Figure 1 illustrates the essential parts of one form of phonograph to which the invention is applied. As shown, the phonograph includes a mounting panel or base plate 15 which serves to carry the various parts. A turntable 16 is rotatably mounted on the panel and is adapted to support records during the playing thereof. The turntable may be driven by means of the usual well-known motor-idler assembly (not shown). A tone-arm 17 is mounted on the supporting panel to move both horizontally and vertically with respect to the turntable. The tone-arm carries a suitable pickup having the usual reproducing stylus or needle 18 which is adapted for engagement with the groove of the record being played.

As previously stated, the phonograph is of the type in which a stack of records is supported above the turntable, and the records are successively dropped into playing position over the turntable. In order that records of the kind having the smaller central aperture may be played on the phonograph, the latter is provided with a suitable center spindle having a diameter corresponding to the diameter of such smaller aperture. Such a spindle is represented at 19, and the manner in which said spindle is mounted is shown in Figure 1. As seen in this figure, the turntable is provided with an axially disposed tubular hub 20 which passes through an opening 21 in the mounting panel 15 and which is concentric with and rotatable on an upright tubular axle 22. This axle is fixedly supported on a bracket or bridge 23 which is rigidly suspended from the mounting panel by means of posts, such as the one illustrated at 24. The lower end of the hub 20 rests on a ball-race bearing 25 retained on the bracket or bridge 23, and a side bearing 26 is advantageously provided between the turntable hub and the axle, at their upper portions, to insure stability of the turntable during its rotation about said axle. As can be seen in Figure 1, the spindle 19 is received in said axle and is held in position by means of an abutment 27 in engagement with the upper extremity of the axle 22 and by means of a securing element, such as a lock-nut 28.

Figure 2:
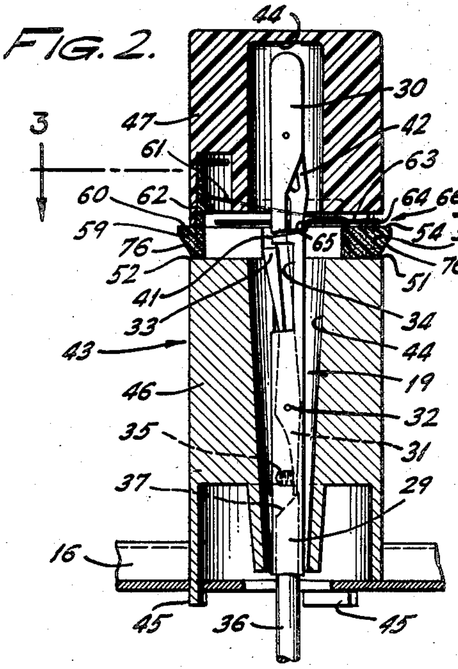
Figure 2 is a vertical cross-sectional view, on a larger scale, through the spindle portion of the apparatus shown in Figure 1, the records being removed for clarity of illustration.
Figure 4:
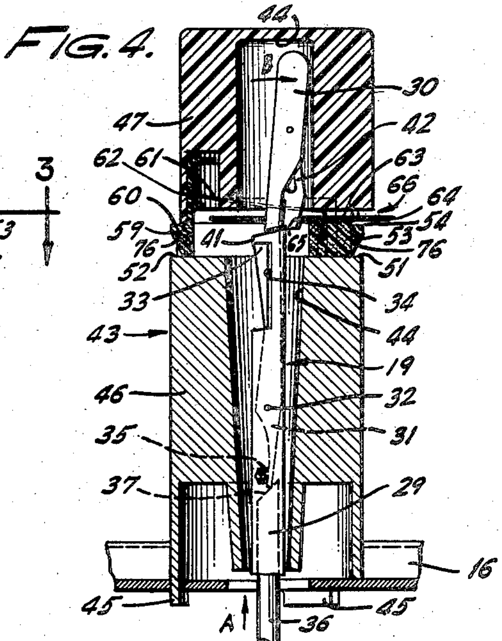
Figure 4 is a view similar to Figure 2 illustrating certain parts in position to effect discharge of a record from a supported position on the central spindle device.

As more clearly illustrated in Figures 2 and 4, the spindle 19 is constructed of a lower part 29 and an upper part or element 30. The lower part is of tubular configuration and a portion 31 of the upper part extends downwardly into said lower part and is pivoted thereto, as is represented at 32. An offset shoulder 33 is provided on the upper part 30 and is aligned with a cut-away portion 34 on the lower part 29 so that when said upper part is moved from the position shown in Figure 2 to the position shown in Figure 4, said shoulder moves within said cut-away portion. A spring 35 normally maintains the upper part 30 in the position shown in Figure 2, that is, in a position in which the shoulder 33 protrudes out of said cut-away portion 34 and beyond the side of the spindle. In this position, said shoulder will support a stack of records of the kind having the smaller central aperture, when such records are placed in engagement with the upwardly extending upper part 30 of the spindle 19.

Displacement of said upper part to the position illustrated in Figure 4, is accomplished by means of a rod 36 which is slidably received within the tubular lower part 29 of said spindle, and which terminates in a wedge-like end 37 disposed to engage the inner lower end portion 31 of said upper part. The rod is actuated through a lever 38 (Figure 1) pivoted, as at 39, to the bracket 23 and operated by a cam 40. This cam is included in the usual cycling mechanism, the details of which are not shown since the construction and function of such mechanism are well-known in the art.

It is apparent from Figure 4 that upward sliding motion of the rod, as represented by arrow A, causes the upper part 30 of the spindle 19 to move in the direction of arrow B, about the pivot 32 and against the force of the spring 35. In so moving, said upper part carries with it the supported stack of records, except the lowermost record which is restrained by means of a foot 41 at the upper end portion of the fixed lower part 29 of the spindle 19. This foot is of a size to occupy and substantially fill the central aperture of the lowermost record so that, as the shoulder 33 moves within the cut-away portion 34 of said lower part of the spindle 19, said lowermost record is free to slide down the length of said spindle and into playing position on the turntable. The remaining records in the stack are prevented from dropping by means of the foot 41, said records being moved, at that time, by the upper part 30 of the spindle to overlie said foot.

As the record changing cycle approaches its end, and by the time the cam 40 reaches its position of rest, the lever 38 is moved about its pivot 39 through action of a spring 35$a$, thus retracting the rod 36 and allowing return of the upper part 30 of the spindle 19 to the position illustrated in Figure 2. Return of said upper part of the spindle to the latter position displaces the supported stack of records in a direction to slide off the foot 41 and, simultaneously, exposes the shoulder 33 which then underlies the stacked records and supports them, the lowermost records lying substantially flush with said foot and being held in readiness for dropping at the next succeeding cycling operation.

The portion of the upper part 30 which is immediately above the foot 41 is provided with the customary sliding detent 42 so as to permit unobstructed removal of records from the turntable. From Figures 2 and 4, it is apparent that when records are manually lifted off the turntable and slid upwardly along the length of the spindle 19, the records will first come in contact with shouldered portion 33. This portion is tapered so that continued upper movement of the records forces said portion into the cut-away portion 34, thus causing the upper part 30 to pivot from the position shown in Figure 2 to the position shown in Figure 4. As the records are lifted further up the spindle, they contact the detent 42, which then moves out of the way of the records and allows them to slip off the spindle.

In accordance with the invention, an adapter spindle, designated in its entirety by the reference character 43, is provided to accommodate records having the larger central aperture. As shown, this adapter spindle is constructed to slip over the smaller spindle 19 and, for that purpose, is provided with an internal cavity 44 into which said smaller spindle fits. The adapter spindle 43 is also constructed to lock onto the turntable, as by means of bayonet type connections 45.

As best seen in Figures 2, 4, 6 and 7, the adapter spindle is made up of two main parts or sections, that is, a lower part or section 46 and an upper part or section 47. These parts are of generally cylindrical configuration and are interconnected by means of a stub shaft 48 (see Figure 6) which is secured to the upper part 47 as by means of a spline connection 48$a$. This stub shaft rotatably extends through bore 49 in the lower part 46 of the adapter spindle and is retained therein as by means of a stop nut 48$b$. The stub shaft 48 is located off-center with respect to the longitudinal axis of the adapter spindle and defines an eccentrically disposed axis about which said upper part 47 can oscillate in a horizontal path.

In the illustrated embodiment, the upper end portion of the lower part 46 of the adapter spindle has a transverse slot 50 providing windows 51 and 52 which open at diametrically opposite points on the cylindrical surface of said lower part. A finger 53 having a shoulder 54 is seated in a recess 55 (see Figures 6 and 7) which is provided within said upper end portion of said lower part. This finger 53 is pivoted as at 56 so that its shoulder 54 registers with one of the mentioned windows (the window 51). A spring 57 is associated with said finger 53 and resiliently urges it into a position in which said shoulder projects through said window 51 for a short distance beyond the cylindrical surface of the adapter spindle. The distance that the shoulder projects from said surface of the adapter spindle is determined by means of a stop 58 (see Figure 9) which is conveniently provided by interengageable surfaces of said finger 53 and of said spindle.

Another finger 59 is mounted for piovtal movement on the upper part 47 of the adapter spindle and is provided with a shoulder 60 arranged to register with the other of the mentioned windows in the lower part 46, the window 52 in the illustrated embodiment. Spring means in the convenient form of a wire 61 anchored by means of the heretofore mentioned stub shaft 48, engages said other finger 59 and resiliently urges the latter into a position in which the shoulder 60 of said other finger projects through said window 52 for a short distance beyond the cylindrical surface of the adapter spindle. The distance that such shoulder projects is determined by means of a stop 62 conveniently provided by adjacent contacting surfaces of said finger 59 and of said adapter spindle.

Figure 3:
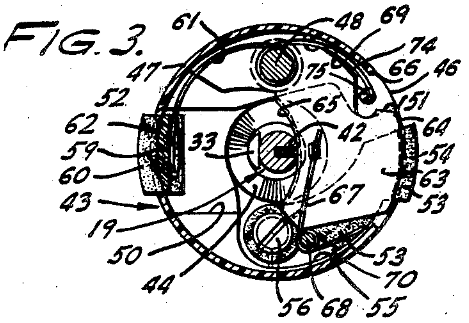
Figure 3 is a cross-sectional view on a still larger scale taken substantially on line 3—3 of Figure 2.
Figure 5:
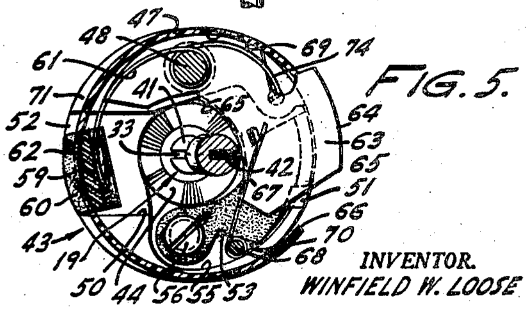
Figure 5 is a view similar to Figure 3, but illustrates the parts in the position shown in Figure 4.
Figure 6:
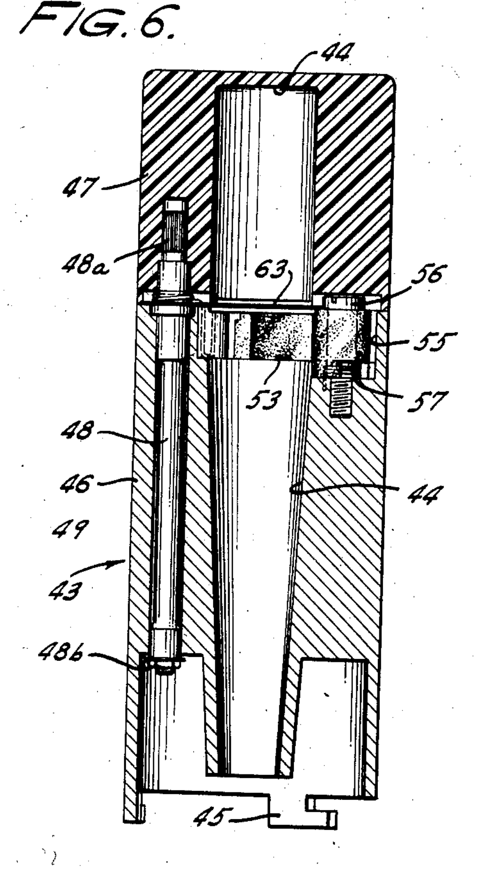
Figure 6 is an enlarged longitudinal cross-sectional view through the larger or adapter spindle taken in a plane at substantially right angles to the plane of the cross-sectional showing of Figure 2.
Figure 7:
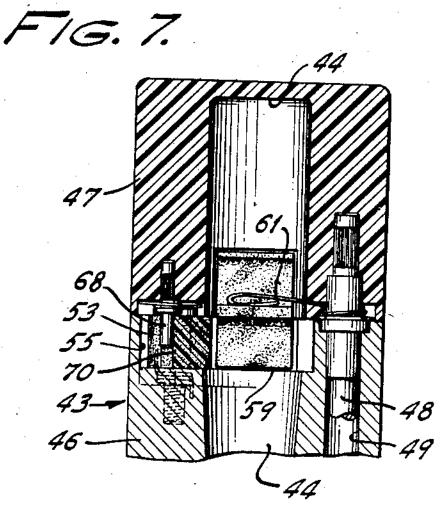
Figure 7 is a fragmentary longitudinal cross-sectional view looking at the adapter spindle from a direction diametrically opposite to that of Figure 6.

A blade 63 is also mounted for pivotal movement on the upper part 47 of the adapter spindle, the mentioned eccentrically located stub shaft 48 advantageously providing the pivot for said blade. This blade includes an outer edge 64 and an inner edge 65. The outer edge is aligned with a slit-like opening 66 which is cut in the lower peripheral edge portion of said upper part 47 and is disposed at a point diametrically opposite to the point where the finger 59 is located, so that said outer edge overlies the finger 53 located on the lower part 46 of the adapter spindle. Resilient means such as a spring wire 67 which is anchored by means of a pin 68, engages the blade 63 and yieldably maintains it in a position in which said outer edge 64 is completely enclosed within the adapter spindle. The inner edge 65 of the blade normally overlaps part of the cavity 44 in the adapter spindle so that, as best seen in Figures 2 and 3, said inner edge lies adjacent the movable upper part 30 of the smaller spindle when the adapter spindle 43 is associated with the latter. In this manner, as illustrated in Figures 4 and 5, the upper part 30 of the smaller spindle, when moved during a record changing cycle, contacts said inner edge 65 of the blade and causes the latter to move outwardly beyond the circumferential outline of the adapter spindle so as to enter between the lowermost record and the record immediately above it. This action is clearly represented in Figure 10 of the drawings.

Outward movement of the blade is limited by means of a portion 69 disposed on said blade to abut, as best seen in Figure 5, a portion of the upper part 47 of the adapter spindle, whereupon said upper part is caused to pivot relatively to the lower part 46 of said adapter spindle. Simultaneously with the pivotal movement of said upper part 47 of the adapter spindle, the pin 68 which extends into engagement with a camming surface 70 on the finger 53 located below the blade, causes said finger to pivot and retract the shoulder 54. The other finger 59 which is carried by said upper part 47, moves therewith so that the shoulder 60 on said other finger becomes located inwardly to the circumferential outline of the lower part 46 of the adapter spindle.

Figures 9, 10:
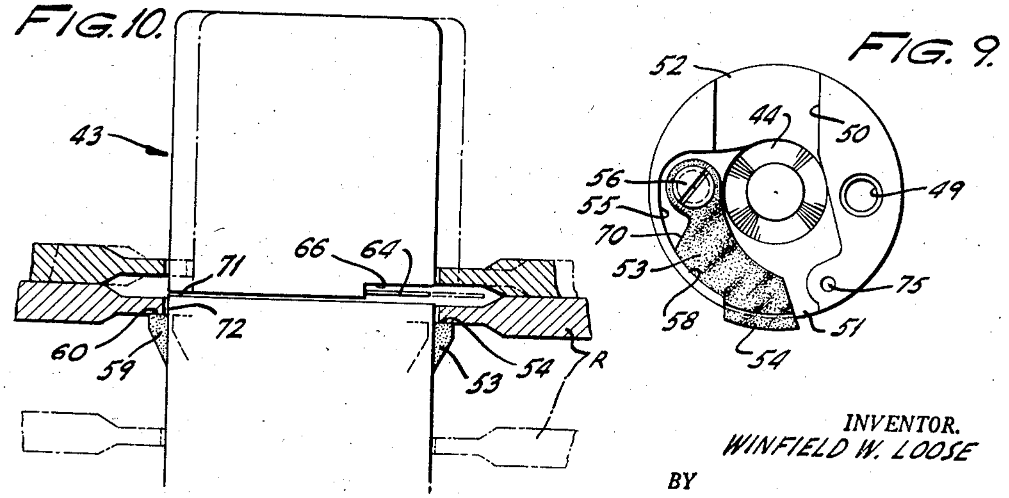
Figure 9 is a top plan view of the lower part of the adapter spindle.
Figure 10 is a schematic explanatory view, certain parts being shown on an exaggerated scale to illustrate the relationship between said parts.

As is illustrated in Figure 10, the above described outward movement of the bade 63 and inward retraction of the shoulders 54 and 60 effects release of the lowermost record R in the supported stack and, also effects retention of the remaining records in said stack in a suspended position. It will be noted that after the lowermost record R is released, the next lowermost record will come in contact with the projected blade and also with a top surface portion 71 of the lower part 46 of the adapter spindle, said surface portion being exposed as a result of the movement of the upper part 47 out of alignment with respect to the lower part 46. Moreover, as is clearly apparent from Figure 10, the shoulder 60 is spaced from the uppermost marginal edge of the lower part 46 for a distance substantially equal to the thickness of the apertured portion of a record, so that a portion 72 of the fixed lower part 46, which portion is above shoulder 60, restrains the lowermost record during displacement of the superposed records with movement of the upper part 47. In this manner, said lowermost record is held in position to drop when shoulders 54 and 60 are retracted.

Figure 8:
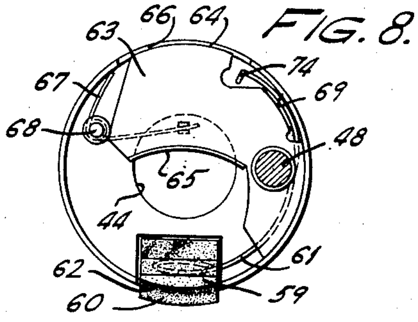
Figure 8 is a bottom plan view of the upper part of the adapter spindle.

As is clearly shown in Figures 3 and 8, spring tension means 74 is provided to maintain the upper part 47 of the adapter spindle in normal position, that is, in longitudinal alignment to the lower part 46 of said spindle, and also, to return said upper part from its offset record-discharging position. In the illustrated embodiment, the spring tension means advantageously comprises an extension of the spring wire 61 which is anchored on the upper part 47 of the adapter spindle, said extension being clamped within an opening 75 in the lower part 46 of the spindle and establishing a resilient connection between said upper and lower parts.

Because of the resilient mounting of the two fingers 53 and 59, records may be manually lifted off the turntable and withdrawn along the length of the spindle, it being understood that the records in passing said fingers will deflect them inwardly of the adapter spindle. In order to facilitate this action, the surface of the fingers below the shoulders 54 and 60 are tapered, as is shown at 76, in a downward and inward direction with respect to the circumferential surface of the adapter spindle.

From the foregoing description, it will be appreciated that an arrangement constructed in accordance with the invention, insures adequate support and discharge of records either of the kind having the smaller central aperture or of the kind having the larger central aperture. The efficiency and reliability of the arrangement is enhanced by the fact that the invention makes it possible to reduce to a minimum the number of operative parts employed to accomplish the record-supporting and record-discharging functions of the automatic phonograph apparatus. Moreover, the dependability of the arrangement is assured due to the simplicity of the operation of a structure wherein associated parts of a smaller spindle and of a larger adapter spindle are moved with respect to each other for placement in two positions, said parts, when in one of said positions, functioning to support records and, when in the other of said positions, functioning to effect dropping of the lowermost supported records.

I claim:

1. For use with a phonograph provided with a horizontally rotatable turntable and a non-rotatable spindle extending vertically from the center of the turntable to support records of the type having a smaller central aperture, said spindle including an upper element movable radially of the turntable to effect dropping of the supported lowermost record; an adapter device for supporting and dropping records of the type having a larger central aperture, said device comprising an elongated lower section, an elongated upper section, said sections being disposed end to end and constructed to receive the phonograph spindle including the mentioned movable element thereof, means for movably interconnecting said sections to provide for movement of the upper section transversely with respect to the lower section, a record-supporting member movably mounted between said sections and normally protruding laterally thereof to support a stack of records, a blade movably mounted between said sections and above said member, said blade being normally retracted inwardly of said sections and having an edge portion which lies in a position where the mentioned spindle element in its radial movement contacts said edge and moves the blade to protrude laterally of said sections to separate the lowermost record from the stack, said blade having another edge which in said movement of the blade contacts said upper section to move the same transversely with respect to the lower section, and said upper section having means which in said movement of said upper section engages said record-supporting member and retracts the same laterally inwardly of said sections to release the lowermost record.

2. The device set forth in claim 1, in which the last named means is provided by a pin projecting downwardly from the mentioned upper section, and the mentioned member is pivotally mounted on the mentioned lower section and is constructed with a cam surface cooperating with said pin to effect the mentioned movement of said member.

3. The device set forth in claim 1, in which the mentioned means for interconnecting the mentioned lower and upper sections include a pivot defining an axis about which the upper section moves with respect to the lower section.

4. The device set forth in claim 1, in which the mentioned lower and upper sections are cylindrical and have the same diameter, and means is provided between said sections normally to maintain their longitudinal central axis in alignment, the mentioned means for interconnecting said sections including a pivot paralleling said axis and offset with respect thereto to cause the upper section to move eccentrically with respect to the lower section.

5. The device set forth in claim 1, in which a second record-supporting member is carried by the mentioned upper section, said member being located normally to project outwardly of said device and to move inwardly with respect to the mentioned lower section when said upper section is moved transversely of said lower section.

6. For use with a phonograph provided with a horizontally rotatable turntable and a non-rotatable spindle extending vertically from the center of the turntable to support records of the type having a smaller central aperture, said spindle including an upper element movable radially of the turntable to effect dropping of the supported lowermost record; an adapter device for supporting and dropping records of the type having a larger central aperture, said device comprising a cylindrical lower section, a cylindrical upper section movably connected to said lower section, said sections being normally disposed in coaxial alignment and having coaxial bores for receiving the phonograph spindle including the mentioned movable element thereof, a member movably attached to said lower section and having a shoulder for supporting a stack of records, a blade movably attached to said upper section and having a portion for separating the lowermost record from the supported stack, spring means for normally maintaining said member in a position where its mentioned shoulder protrudes beyond the outer circumference of said sections, other spring means for normally maintaining said blade in a position where its mentioned portion is retracted within the confines of said upper section, means including the mentioned spindle element for moving said blade to a position where said portion protrudes beyond the outer circumference of said sections, abutting means between said blade and upper section to move the latter out of coaxial alignment with respect to the lower section in response to said movement of said blade, and other abutting means between said upper section and said member to move the latter to a position where said shoulder is retracted within the confines of said sections in response to said movement of the upper section.

References Cited in the file of this patent

UNITED STATES PATENTS

| | | |
|---|---|---|
| 2,549,246 | Schweitzer | Apr. 17, 1951 |
| 2,634,135 | Carson | Apr. 7, 1953 |
| 2,651,523 | Dale | Sept. 8, 1953 |
| 2,666,647 | Dale | Jan. 19, 1954 |
| 2,666,648 | Dale | Jan. 19, 1954 |

FOREIGN PATENTS

| | | |
|---|---|---|
| 674,361 | Great Britain | June 25, 1952 |
| 70,851 | Norway | Aug. 12, 1946 |